United States Patent [19]

Pytlewski et al.

[11] 4,349,380

[45] Sep. 14, 1982

[54] METHOD OF RECOVERING METALS FROM METAL CONTAINING MATERIALS

[75] Inventors: Louis L. Pytlewski; Kenneth Krevitz, both of Philadelphia, Pa.

[73] Assignee: The Franklin Institute, Philadelphia, Pa.

[21] Appl. No.: 250,009

[22] Filed: Apr. 1, 1981

[51] Int. Cl.³ .................... C22B 11/04; C22B 15/12; C22B 23/04
[52] U.S. Cl. .............................. 75/0.5 A; 75/0.5 AA; 75/0.5 AB; 75/117; 75/118 R; 75/118 P; 75/119; 75/120; 75/121
[58] Field of Search ......... 75/0.5 A, 0.5 AA, 0.5 AB, 75/118 R, 118 P, 108, 119, 117, 120, 121

[56] References Cited

U.S. PATENT DOCUMENTS

| | | |
|---|---|---|
| 553,115 | 1/1895 | Galbraith . |
| 1,350,157 | 8/1920 | Horton . |
| 3,826,755 | 7/1974 | Grimes .......................... 252/301.1 |
| 3,833,351 | 9/1974 | Neskora et al. ................. 75/0.5 A |
| 3,833,353 | 9/1974 | Taylor ................................ 75/21 |
| 3,885,955 | 5/1975 | Lutz et al. ...................... 75/0.5 A |
| 3,892,557 | 7/1975 | Lutz et al. ...................... 75/0.5 A |
| 3,899,322 | 8/1975 | Yosim et al. ....................... 75/65 |
| 4,038,080 | 7/1977 | Fisch et al. .................... 75/118 P |

*Primary Examiner*—W. Stallard
*Attorney, Agent, or Firm*—Dann, Dorfman, Herrell and Skillman

[57] ABSTRACT

Valuable metals are recovered from metal-containing materials, such as scrap or waste materials, in which the metal is present in chemically combined form, by a process which comprises contacting the metal-containing material with a reagent comprising the product of the reaction of an alkali metal or alkali metal hydroxide with a polyglycol or a polyglycol monoalkyl ether and oxygen.

7 Claims, No Drawings

METHOD OF RECOVERING METALS FROM METAL CONTAINING MATERIALS

BACKGROUND OF THE INVENTION

This invention relates to the recovery of metals from waste or scrap materials and in particular to a process in which free metals are obtained by reduction of chemically combined forms of the metals under mild, readily controlled conditions.

The reducing capability of the alkali metals, lithium, sodium, potassium, rubidium and cesium, is well known. The oxidation potentials of these metals range from +2.71 volts for sodium to +3.05 volts for lithium, the oxidation potential being a measure of the reducing strength of the metal. These high values place the alkali metal at the top of the electromotive force series, indicating that, in theory, they will reduce virtually any oxidizing agent no matter how weak.

As a practical matter the full reducing capability of the alkali metals has remained largely unrealized. For example, sodium has been used extensively in the form of its solution in liquid ammonia for the production of metals from their salts, however, its reducing properties are appreciably diminished in this form, in comparison with the pure metal. Reduction processes which have been developed heretofore employing pure alkali metals have proven to be generally unsatisfactory in that they are operable on a relatively small scale, require specialized equipment, and often involve rather extreme operating conditions, such as complete exclusion of air and water.

Presently, considerable amounts of precious and other useful metals are disposed of each year because of the difficulty of recovering the metal economically by currently available technology. For example, exposed photographic film containing silver salts, and mine tailings containing appreciable quantities of metal ores are simply discarded because recovery by presently available methods is generally unprofitable.

The desirability of a commercially practicable method employing alkali metals for the recovery of a wide variety of less reactive metals by chemical reduction has led to the development of the present invention.

SUMMARY OF THE INVENTION

The present invention provides a process for recovering metals that are lower than the alkali metals in the electomotive force series from metal-containing materials in which the metal is present in chemically combined form. As used herein, the expressions "metal in chemically combined formed" or "chemically combined form of a metal" are intended to signify that the metal is associated with other chemical substances in a stable aggregate, such as a chemical compound held together by covalent, ionic, or hydrogen bonds, a complex formed from a central metal atom and a number of bound groups, or ligands, or any other stable arrangement that a metal may assume.

The process involves the use of a reagent produced by the reaction between an alkali metal or hydroxide thereof, a polyglycol or derivative thereof, and oxygen. By contacting the metal containing material with this reagent, the metal is readily recoverable in elemental form from the metal-containing material.

The reagent employed in the practice of this invention has excellent reducing properties, and its preparation and use may be carried out under moderate operating conditions with the simplest of equipment.

DESCRIPTION OF THE INVENTION

The alkali metals normally employed to produce the aforesaid reagent include lithium, sodium and potassium and amalgams of these metals, with sodium and potassium being preferred. Any of the alkali metal hydroxides may be used in practicing the method of the present invention. The hydroxides of lithium, sodium and potassium, or mixtures thereof, are preferred because of their ready availability and relatively low cost. Of these, sodium hydroxide is particularly preferred.

Solid alkali metal hydroxide or an aqueous solution thereof may be used to produce the reagent. However, to the extent that the hydroxide and/or water may interfere with the recovery of the free metal, as, for example, by the formation of insoluble metal hydroxides, the presence of these substances in the reagent should be avoided.

The alkali metal or hydroxide is reacted with a compound of the general formula:

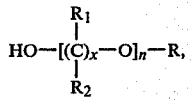

wherein R is hydrogen or lower-alkyl, $R_1$ and $R_2$ are the same or different and are selected from the group consisting of hydrogen, unsubstituted or substituted lower alkyl, unsubstituted or substituted cycloalkyl having from 5 to 8 carbon atoms, and unsubstituted or substituted aryl, "n" has a value from about 2 to about 400, and "x" has a value of at least 2, which includes polyglycols and polyglycol monalkyl ethers. The lower alkyl radical in the foregoing formula may be methyl, ethyl, propyl, butyl, isobutyl, pentyl or hexyl, i.e., the term lower alkyl embraces radicals having up to six carbon atoms.

The cycloalkyl radical may be cyclopentyl, cyclohexyl, cycloheptyl and cyclooctyl. The aryl radical may be phenyl, benzyl, biphenyl, naphthyl, etc. The substituents on the $R_1$ and $R_2$ radicals include, but are not limited to lower-alkyl, e.g. methyl, ethyl, propyl, butyl, isobutyl, etc,; halo, e.g. chloro, bromo; nitro; sulfato; carboxyl; amino; mono- and di-lower-alkylamino, e.g. methylethylamino; amido; hydroxy; lower alkoxy, e.g. methoxy, ethoxy, etc.

Suitable liquid reactants falling within the above formula include diethylene glycol, diethylene glycol monomethyl ether, polyether glycols, such as polyethylene glycols, polypropylene glycols, and polybutylene glycols and related long chain glycol monoalkyl ethers. The preferred liquid reactants are those of the above general formula wherein $R_1$ and $R_2$ are hydrogen and x is 2. Particularly preferred are polyethylene glycols, i.e., polymers of the formula $HO-CH_2-CH_2O]_nH$, having an average molecular weight range from about 100 to about 20,000. The above-described reactants may be either liquids or solids. Those which are solids should be melted before the reaction is begun. Neither low volatility, non-polar liquids, nor glycolic liquids in which both terminal hydroxyl groups are alkylated has been found to produce the desired reactivity.

The term "polyglycols", as used herein, is intended to signify polymers of dihydric alcohols.

Oxygen is a necessary third reactant in the formation of the above-described reagent. When the formation of the reagent is carried out in the presence of air, for example, the alkali metal and the compound of the above general formula react vigorously with the evolution of hydrogen gas. When reaction occurs, the reaction mixture takes on a deep amber color. This color change is distinct and readily observable and signals the formation of the reagent. The reactions involving alkali metal hydroxides proceed in generally the same way, except that no hydrogen gas is evolved. Attempts to carry out the reaction of sodium or sodium hydroxide with polyethylene glycol in an oxygen-free atmosphere have produced a relatively clear solution which was ineffective for carrying out the method of this invention. However, it has been found that when sodium or sodium hydroxide and polyethylene glycol are reacted in an atmosphere consisting essentially of nitrogen, and oxygen is thereafter introduced into the resultant solution, the decomposition reagent will be formed, as indicated by the aforementioned color change. Thus, the required reactants may be reacted simultaneously, or according to the two-step procedure just described. When using an alkali metal, the two-step procedure is advantageous in that it avoids having a potentially explosive mixture of hydrogen and oxygen present in the reaction system.

Generally, the reaction for producing the reagent proceeds spontaneously at room temperature simply by mixing the reactants in an open reaction vessel, preferably with stirring. It is unnecessary to bubble oxygen into the reaction mixture, for atmospheric oxygen satisfies the requirements of the reaction. Thus, no temperature control or specialized equipment is required for carrying out the reaction. If desired, the reaction mixture may be heated to accelerate the rate of reaction. The reaction mixture may be heated to a temperature in the range of 30° C. to about 200° C. and proceeds very satisfactorily at a temperature between about 50° C. and about 100° C. The reaction may be conveniently carried out at atmospheric pressure with excellent results; superatmospheric pressure may be employed, if desired. The stoichiometry of the reaction requires one mole of alkali metal or alkali metal hydroxide per mole of compound of the above general formula.

In the reaction between sodium metal and polyethylene glycol (avg. M.W. 400), for example, heating of the reaction mixture to between about 50° C. and about 80° C. gives a reasonable rate of reaction. Upon heating, the reaction becomes exothermic and the temperature of the reaction mixture rises to near or above the melting point of the sodium, which is 97.6° C. With the rise in temperature, the sodium becomes molten and reaction with the liquid ensues. This reaction is considerably more exothermic than the reaction in which alkali metal hydroxides are employed as a starting material.

Once formed, the reagent may be used immediately, or it may be stored for later use. In general, the reagent may be stored for at least six months without appreciably diminishing its reactivity.

As indicated above, the recovery of a particular metal is accomplished simply by contacting the metal-containing material with the above-described decomposition reagent. In order to bring about effective contact between the metal in its combined form and the decomposition reagent, the metal containing material may be ground up, comminuted or otherwise reduced to a relatively small particle size. The preferred temperature range for carrying out the recovery method is from about room temperature to about 250° C. The reduced metal can be isolated or collected by any of the methods well known in the art, such as gravity settling or centrifugation.

Ordinarily, heating of the reaction mixture to a temperature as high as 250° C. will be required only when the reagent is relatively viscous. In such cases, the viscosity of the reagent may be reduced by diluting it with a solvent. A wide variety of solvents are suitable for this purpose, including alcohols, ketones, and aliphatic and aromatic hydrocarbons. These are conveniently added to the reagent with stirring.

A wide variety of metals can be recovered by the method of this invention which is generally applicable to the recovery of any metal that is lower in the electromotive force series than the particular alkali metal used in forming the reagent. Thus, the present method may be employed in the recovery of the metals of Group 1b of the Periodic Table of the Elements, viz. copper, silver and gold. This method may also be used to advantage in recovering the Group 8 metals, iron, cobalt, nickel, ruthenium, rhodium, palladium, osmium, iridium and platinum. Other metals, such as tin, cadmium, lead, molybdenum, beryllium, selenium and tungsten may also be recovered by the method of this invention.

The invention is more fully illustrated in the following examples.

EXAMPLE I

Preparation of Decomposition Reagent and Recovery of Metallic Silver

A sodium polyethylene glycol reagent (referred to in these examples as NaPEG) was prepared by placing 900 ml of polyethylene glycol having an average molecular weight of 400 (referred to in these examples as PEG 400) in a 3000 ml beaker and heating until the temperature approached 80° C. Stirring was accomplished by using an efficient overhead mechanical stirrer. A magnetic stirring assembly may also be used. Thereafter, approximately 55 grams of freshly cut sodium metal was added, all within a two minute period. The normal precautions for the handling of metallic sodium should be taken in carrying out the reaction. Within ten minutes the temperature of the mixture rose to about 120° C. and was maintained as close as possible to that temperature until all of the sodium, which melted and formed a shiny layer of metallic globules on top of the solvent, had reacted. Reaction is indicated by the change in color of the PEG 400 to a dark amber and the disappearance of the metallic globules. If all of the sodium does not react, small additions of PEG 400 may be used to effect complete reaction. Alternatively, the NaPEG mixture may be placed in a separatory funnel and the lower NaPEG layer drawn off. The unreacted sodium metal will rise to the top and may be removed by reaction with an alcohol, such as methanol.

To the decomposition agent, maintained in the beaker at about 100° C., there was added with stirring a quantity of ground up waste material containing $Ag_2SO_4$. Almost immediately, finely divided silver metal was deposited on the bottom of the beaker.

Similar results may be obtained with pulverized waste material containing other precious metal compounds, such as $AgOOCCH_3$, $Ag_2O$, and $AgCl$, or complexes, such as $Au(CN)_4^{-4}$.

EXAMPLE II

Recovery of Cobalt

A decomposition reagent was prepared as described in Example I. To the reagent, there was added pulverized non-magnetic cobalt oxide. Again, almost immediately, there was deposited on the bottom of the vessel reflective metallic particles. These particles were ferromagnetic as indicated by their attraction to a magnetic stirring bar. The particles were determined to be pure cobalt metal by scanning electron microscopy.

Those skilled in the art will appreciate that the description of this invention set forth in the foregoing specification and examples is intended merely to illustrate and not to limit the invention. It will also be appreciated that the implementation of the above-described process is capable of wide variation and modification without departing from the spirit and scope of the invention as set forth in the appended claims.

We claim:

1. A method for recovering a metal that is lower than the alkali metals in the electromotive force series from a material containing said metal in chemically combined form, said method comprising:
   a. providing a reagent comprising the product of the reaction of an alkali metal or alkali metal hydroxide, a reactant having the general formula

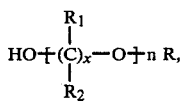

wherein R is hydrogen or lower alkyl, $R_1$ and $R_2$ are the same or different and are selected from the group consisting of hydrogen, unsubstituted or substituted lower alkyl, unsubstituted or substituted cycloalkyl having from 5 to 8 carbon atoms, and unsubstituted or substituted aryl, n has a value from about 2 to about 400 and x has a value of at least 2, and oxygen;
   b. contacting said decomposition reagent with said metal-containing material; and
   c. recovering the free metal.

2. The method claimed in claim 1 wherein said decomposition reagent is produced from an alkali metal selected from the group consisting of sodium, lithium, potassium and amalgams thereof and a reactant of the above general formula wherein $R_1$ and $R_2$ are hydrogen and x is 2.

3. The method claimed in claim 1 wherein the decomposition reagent is produced from sodium and polyethylene glycol.

4. The method of claim 1 wherein the contacting step is carried out at a temperature between about room temperature and about 250° C.

5. The method of claim 1 wherein the reagent is diluted with a solvent selected from the group consisting of alcohols, ketones, and aliphatic and aromatic hydrocarbons.

6. The method of claim 1 wherein the metal recovered is from Group 1b of the Periodic Table of the Elements.

7. The method of claim 1 wherein the metal recovered is from Group 8 of the Periodic Table of the Elements.

* * * * *

UNITED STATES PATENT AND TRADEMARK OFFICE
CERTIFICATE OF CORRECTION

PATENT NO. : 4,349,380
DATED : September 14, 1982
INVENTOR(S) : Louis L. Pytlewski and Kenneth Krevitz It is certified that error appears in the above-identified patent and that said Letters Patent are hereby corrected as shown below:

Column 1, line 50, "electomotive" should read --electromotive--.

Column 2, line 59, "$HO-CH_2O]_nH$" should read --$HO[CH_2-CH_2O]_nH$--.

Column 3, line 5, "With" should read --with--.

Signed and Sealed this

Seventh Day of December 1982

[SEAL]

Attest:

*Attesting Officer*

GERALD J. MOSSINGHOFF
*Commissioner of Patents and Trademarks*